(12) United States Patent
Cebere et al.

(10) Patent No.: US 11,750,363 B2
(45) Date of Patent: Sep. 5, 2023

(54) PRIVACY-PRESERVING DOMAIN NAME SERVICE (DNS)

(71) Applicant: Bitdefender IPR Management Ltd., Nicosia (CY)

(72) Inventors: Bogdan C. Cebere, Buchare (RO); Elena Burceanu, Buchare (RO); Madalina Bolboceanu, Focsani (RO); Emanuela Haller, Buchare (RO); Georgiana M. Rosca, Buchare (RO); Radu Titiu, Buchare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 289 days.

(21) Appl. No.: 16/949,587

(22) Filed: Nov. 4, 2020

(65) Prior Publication Data

US 2022/0140996 A1 May 5, 2022

(51) Int. Cl.
| | |
|---|---|
| *H04L 9/00* | (2022.01) |
| *G06F 16/22* | (2019.01) |
| *H04L 9/32* | (2006.01) |
| *H04L 61/2539* | (2022.01) |
| *H04L 61/4511* | (2022.01) |

(52) U.S. Cl.
CPC .......... *H04L 9/008* (2013.01); *G06F 16/2255* (2019.01); *H04L 9/3213* (2013.01); *H04L 61/2539* (2013.01); *H04L 61/4511* (2022.05)

(58) Field of Classification Search
CPC ... H04L 9/008; H04L 9/3213; H04L 61/2539; H04L 61/4511; H04L 2101/35; G06F 16/2255

See application file for complete search history.

(56) References Cited

U.S. PATENT DOCUMENTS

| | | | |
|---|---|---|---|
| 10,346,627 B2 | 7/2019 | Kaliski, Jr. | |
| 10,635,824 B1 * | 4/2020 | Triandopoulos | ...... G06F 21/602 |
| 10,666,672 B2 * | 5/2020 | Arnell | ...... H04L 12/22 |
| 10,999,240 B1 * | 5/2021 | Osterweil | ...... H04L 61/10 |
| 2014/0122476 A1 * | 5/2014 | Kaliski, Jr. | ...... G06F 21/6227 |
| | | | 707/E17.014 |
| 2014/0123301 A1 * | 5/2014 | Kaliski, Jr. | ...... H04L 61/5007 |
| | | | 726/26 |

(Continued)

OTHER PUBLICATIONS

Wikipedia, List of Internet top-level domains, pp. 1-72, dated Oct. 2020, downloaded from the Internet, URL: https://en.wikipedia.org/w/index.php?title=List_of_Internet_top-level_domains&oldid=985496905#A (Year: 2020).*

(Continued)

*Primary Examiner* — Linglan Edwards
*Assistant Examiner* — Vy H Ho
(74) *Attorney, Agent, or Firm* — Law Office of Andrei D Popovici, PC

(57) ABSTRACT

Described systems and methods allow carrying out privacy-preserving DNS exchanges. In some embodiments, a client machine engages in a private information retrieval (PIR) exchange with a nameserver. In response to receiving an encrypted query from the client, the query formulated according to a domain name, the nameserver may extract a record (e.g., an IP address) from a domain name database without decrypting the respective query. Some embodiments achieve such information retrieval by the use of homomorphic encryption.

19 Claims, 12 Drawing Sheets

(56) References Cited

U.S. PATENT DOCUMENTS

| | | | | |
|---|---|---|---|---|
| 2014/0373177 | A1* | 12/2014 | Arning | G06F 21/604 |
| | | | | 726/28 |
| 2015/0039912 | A1* | 2/2015 | Payton | H04L 9/14 |
| | | | | 713/193 |
| 2017/0093802 | A1 | 3/2017 | Norum et al. | |
| 2018/0144152 | A1 | 5/2018 | Greatwood | |
| 2019/0149317 | A1 | 5/2019 | Payton et al. | |
| 2021/0029074 | A1 | 1/2021 | Buck | |
| 2021/0203475 | A1* | 7/2021 | Xiao | H04L 9/50 |
| 2021/0288946 | A1* | 9/2021 | Borzov | H04L 9/3247 |
| 2021/0319131 | A1* | 10/2021 | Salomon | G06F 16/24528 |

OTHER PUBLICATIONS

Wikipedia, Domain Name System, pp. 1-20, dated Oct. 2020, downloaded from the Internet, URL: https://en.wikipedia.org/w/index.php?title=Domain_Name_System&oldid=983602820 (Year: 2020).*

Wikipedia, DNS over HTTPS, pp. 1-8, dated Oct. 2020, downloaded from the Internet, URL: https://en.wikipedia.org/w/index.php?title=DNS_over_HTTPS&oldid=985166351 (Year: 2020).*

Ali et al., "Communication-Computation Trade-offs in PIR," Cryptology ePrint Archive, Report 2019 / 1483, https://eprint.iacr.org/2019/1483, Dec. 2019.

Gentry et al., "Compressible FHE with Applications to PIR," https://eprint.iacr.org/2019/733.pdf, Nov. 2019.

Schmitt et al., "Oblivious DNS: Practical Privacy for DNS Queries," https://arxiv.org/pdf/1806.00276.pdf, Dec. 2018.

Angel et al., "PIR with compressed queries and amortized query processing," Cryptology ePrint Archive, Report 20171142, https://eprint.iacr.org/2017/1142.pdf, 2017, the year of publication is sufficiently earlier than the effective U.S. filing date and any foreign priority date so that the particular month of the publication is not in issue.

Chor et al., "Private Information Retrieval," 2nd Revision, Apr. 1998.

Hoffmann et al., "RFC 8484—DNS Queries over HTTPS (DoH)," https://tools.ietf.org/html/rfc8484, Oct. 2018.

Wu, "DNS Encryption Explained," https://blog.cloudflare.com/dns-encryption-explained/, Oct. 29, 2019.

European Patent Office (EPO), International Search Report and Written Opinion dated Jul. 8, 2022 for PCT International Application No. PCT/EP2021/080380, international filing date Nov. 2, 2021.

Schmid, "Thirty Years of DNS Insecurity: Current Issues and Perspectives," IEEE Communications Surveys and Tutorials, 23(4):2429-2459, Aug. 23, 2021.

* cited by examiner

PRIVACY-PRESERVING DOMAIN NAME SERVICE (DNS)

BACKGROUND

The invention relates to systems and methods for protecting the privacy of online to communication, and in particular, to preventing a remote entity from acquiring information about the browsing habits of Internet users.

Browsing the Internet has become an indispensable component of modern life and work. Following the explosion in Internet access, some commercial as well as malicious entities are increasingly interested in accessing and analyzing the browsing history and/or patterns of individual Internet users. Such information may then be used to target advertising and to deliver various services to the respective users. However, the same type of information may be used to profile and/or target users according to more sensitive aspects of their personality, such as sexual orientation, political and religious views, race, substance use, intelligence, etc. A growing number of Internet users is concerned about privacy and how allowing companies and/or the state to monitor their online behavior may affect their rights and expose them to various kinds of threats and abuse.

A common manner in which a user's browsing history is harvested is via domain name service (DNS) requests. DNS typically refers to a service of translating domain names to network (e.g., IP) addresses, which then allows electronic devices to exchange data over communication networks. Since DNS was originally designed for speed and convenience as opposed to privacy, traditionally DNS providers and Internet service providers have had virtually unobstructed access to the DNS requests issued by clients. In recent years, some effort was directed at providing alternatives to classical DNS. Some examples include a suite of protocols known as 'DNS over Transport Layer Security (TLS)' and 'DNS over Hypertext Transfer Protocol Secure (HTTPS)', among others. Such versions of DNS encrypt individual requests from clients and/or server replies, so that in principle, no entity except the end client and the nameserver has access to the respective data. For instance, such protocols may prevent the Internet service provider and/or a malicious third party from snooping on a user's DNS requests. However, since the data is encrypted only during transport between the client and nameserver, such protocols do not prevent the DNS provider itself from harvesting browsing data of the respective user.

There is therefore considerable interest in developing a more capable and robust privacy-preserving domain name service.

SUMMARY

According to one aspect, a method of performing a domain name service (DNS) lookup comprises employing at least one hardware processor of a computer system, in response to receiving an indicator of a domain name, to determine whether a privacy condition is satisfied according to the domain name. The method further comprises, in response to determining whether the privacy condition is satisfied, if yes, formulating a private query comprising an encryption of a hash index indicative of a location of a record within a domain name database, the hash index encrypted according to a homomorphic encryption procedure, and wherein the hash index is determined according to the domain name. The method further comprises, in response to formulating the private query, transmitting the private query to a nameserver configured to perform an encrypted lookup into the domain name database according to the private query, producing an encryption of the record; and in response to receiving a private reply comprising the encryption of the record from the nameserver, decrypting a content of the private reply according to a homomorphic decryption procedure.

According to another aspect, a computer system comprises at least one hardware processor configured, in response to receiving an indicator of a domain name, to determine whether a privacy condition is satisfied according to the domain name. The at least one hardware processor is further configured, in response to determining whether the privacy condition is satisfied, if yes, to formulate a private query comprising an encryption of a hash index indicative of a location of a record within a domain name database, the hash index encrypted according to a homomorphic encryption procedure, and wherein the hash index is determined according to the domain name. The at least one hardware processor is further configured, in response to formulating the private query, to transmit the private query to a nameserver configured to perform an encrypted lookup into the domain name database according to the private query, producing an encryption of the record; and in response to receiving a private reply comprising the encryption of the record from the nameserver, to decrypt a content of the private reply according to a homomorphic decryption procedure.

According to another aspect, a non-transitory computer-readable medium stores instructions which, when executed by at least one hardware processor of a computer system, cause the computer system, in response to receiving an indicator of a domain name, to determine whether a privacy condition is satisfied according to the domain name. The instructions further cause the computer system, in response to determining whether the privacy condition is satisfied, if yes, to formulate a private query comprising an encryption of a hash index indicative of a location of a record within a domain name database, the hash index encrypted according to a homomorphic encryption procedure, and wherein the hash index is determined according to the domain name. The instructions further cause the computer system, in response to formulating the private query, to transmit the private query to a nameserver configured to perform an encrypted lookup into the domain name database according to the private query, producing an encryption of the record; and in response to receiving a private reply comprising the encryption of the record from the nameserver, to decrypt a content of the private reply according to a homomorphic decryption procedure.

According to another aspect, a server computer system is configured to engage in domain name service (DNS) transactions with a plurality of clients. The server computer system comprises at least one hardware processor configured to receive a private query from a client of the plurality of clients, the private query comprising an encryption of a hash index indicative of a location of a record within a domain name database, the hash index encrypted according to a homomorphic encryption procedure, and wherein the hash index is determined according to a domain name. The at least one hardware processor is further configured, in response to receiving the private query, to perform an encrypted lookup into the domain name database according to the private query, producing an encryption of the record; and to transmit a private reply comprising the encryption of the record to the client.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A network domain consists of a group of interconnected computing devices forming a distinct part of a computer network. An Internet domain is a network domain connected to the public Internet. A domain name is a label/alias identifying an address of a network/Internet domain. The term 'database' is used herein to denote any organized collection of data. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
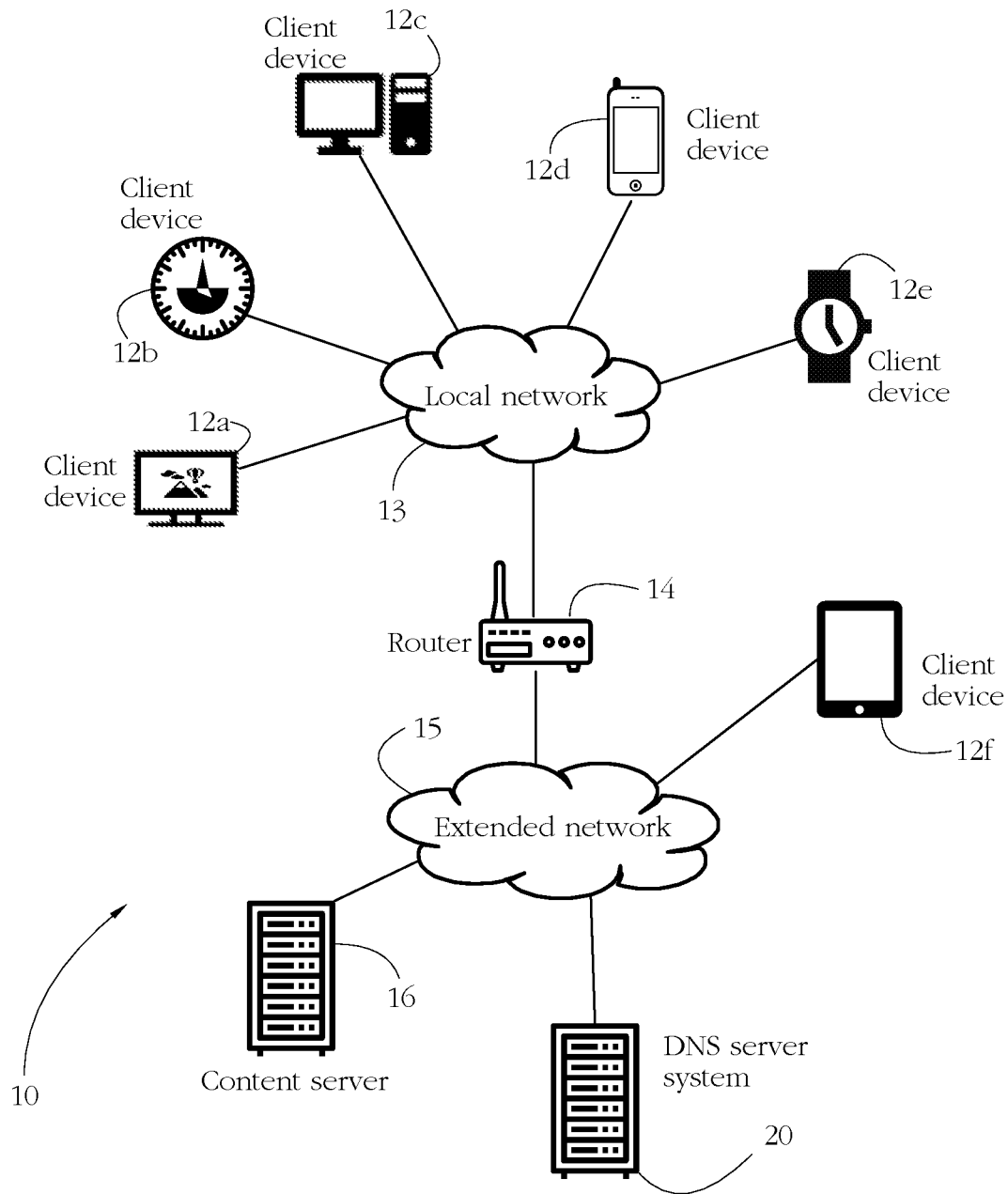
FIG. 1 shows an exemplary privacy-preserving electronic communication system according to some embodiments of the present invention.

FIG. 1 shows a privacy-preserving electronic communication system 10 according to some embodiments of the present invention. A set of exemplary client devices 12a-f communicate with each other and/or with a remote content server computer 16 over communication links, to exchange data such as web content, electronic messages, various documents, etc. Client devices 12a-f may include personal computer systems, corporate mainframe computers, mobile computing platforms (e.g., laptop computers, tablets, mobile telephones), entertainment devices (e.g., TVs, game consoles), wearable devices (e.g., smartwatches, fitness bands), household appliances (e.g., refrigerators, washing machines), and any other electronic device comprising a processor, a memory, and a communication interface enabling the respective device to communicate with other devices/computer systems.

In the exemplary configuration of FIG. 1, client devices 12a-e are interconnected by a local network 13, such as a local area network (LAN). In one exemplary use-case scenario, devices 12a-e represent electronic devices within a home, and local network 13 represents a home network. In another use-case scenario, client devices 12a-e may represent computers located in an office or department of a corporation, and interconnected by a corporate LAN. Devices 12a-e may further be connected to an extended network 15, such as a wide area network (WAN) and/or the Internet. In some embodiments, a router 14 controls and/or manages data traffic within local network 13, for instance by assigning network addresses to clients 12a-e connected to local network 13 and routing individual communications according to such addresses. In some embodiments as illustrated in FIG. 1, router 14 is configured as a gateway to local network 13, in the sense that at least a part of network traffic between client devices 12*a-e* and extended network 15 traverses router 14. Other client devices, such as exemplary device 12*f* in FIG. 1, may not be connected to local network 13, but instead connect directly to extended network 15, for instance by way of a mobile telephony network or a public WiFi hotspot.

A domain name service (DNS) server system 20 provides privacy-preserving domain name services to client devices 12*a-f* according to some embodiments of the present invention. Domain name services are herein meant to encompass translating domain names into network addresses and/or vice versa and providing other domain information including, inter alia, domain registration data (e.g., WHOIS data), and indicators of whether a particular domain belongs to a particular category/cluster of domains, whether a domain distributes adult content, whether a domain engages in malicious activity (e.g., botnets, Internet fraud), etc. DNS server system 20 generically represents a set of communicatively coupled computers, such as exemplary nameservers 20*a-d* illustrated in FIG. 2. The function of each such nameserver is further detailed below. Sending a request to DNS server system 20 encompasses sending the respective request to any of nameservers 20*a-d*.

A typical data exchange between a client device 12*a-f* and content server 16 comprises several steps. Transmission typically requires knowledge of a network address (e.g., Internet Protocol—IP address) of content server 16. Often, this address is not known to the client device, for various reasons. For instance, there may be multiple mirror content server machines, and the client may be dynamically directed to the most convenient one according to the current load of each mirror server or according to the current geographical location of the client device. The client device may however know a domain name of server 16. The term 'domain name' herein denotes any alias of the required network address. To establish a connection to content server 16, a software entity executing on the respective client device may thus issue a request to access the respective domain name, instead of the IP address per se. In response, another software entity (e.g., a component of the operating system executing on the respective client) may intercept the request and attempt to translate the alias/domain name to an actual network address, and subsequently transmit the request to the correct network location. Such translation may invoke a DNS provider such as server system 20 in FIG. 1.

Figure 3:
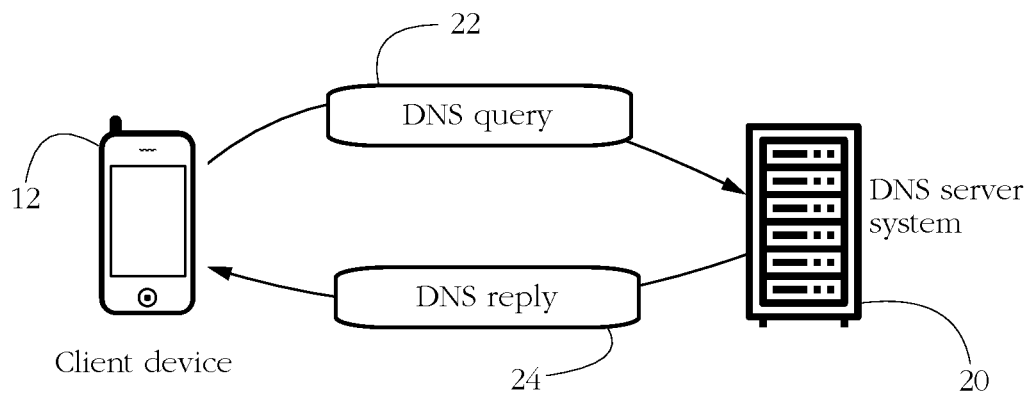
FIG. 3 shows a typical DNS transaction, as known in the prior art.
Figure 4:
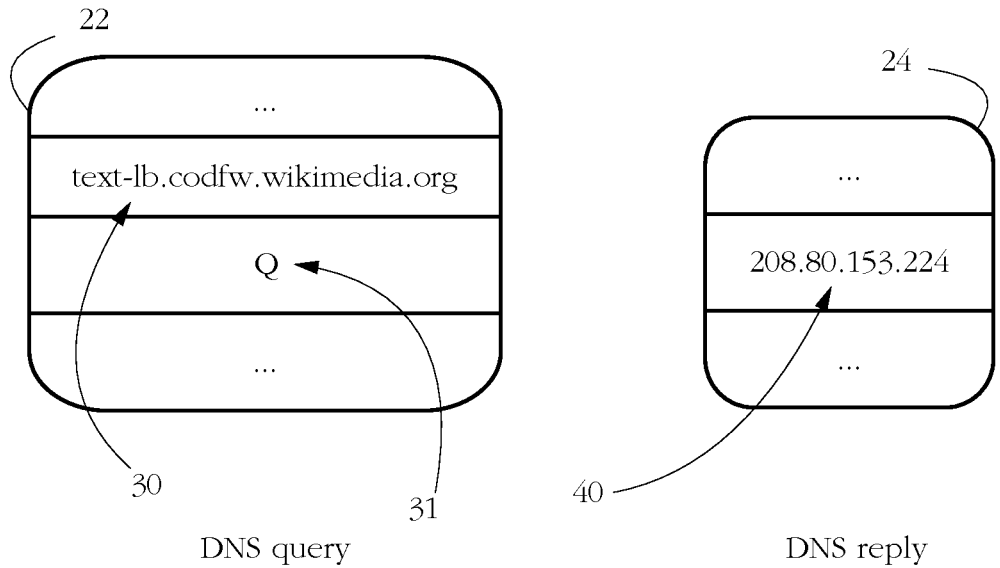
FIG. 4 illustrates a DNS query and reply, as known in the prior art.

FIGS. 3-4 illustrate a typical message exchange according to a DNS protocol as known in the art. A client device 12 transmits a DNS query 22 to DNS server system 20, query 22 comprising an indicator of an Internet domain 30 (e.g., a domain name as shown in FIG. 3), and an indicator of a type of question Q. The type of question indicates a type of DNS resource record returned by DNS server 20. Exemplary questions include 'A' which requests an IP address formulated in a 4th version of the Internet Protocol (IPv4), and 'AAAA' which returns an IP address formulated in a 6th version of the Internet Protocol (IPv6). Other exemplary questions/resource record types include 'TXT', 'PTR', 'LOC', etc. In response, DNS server system 20 may return a DNS reply 24 to the requesting client, reply 24 including an encoding of a resource record network corresponding to the respective domain name/alias. In the example in FIG. 4, the type of record is an IP address 40 in 32-bit IPv4 format. In some cases, for instance in systems using a DNS over HTTPS protocol, DNS query 22 and/or DNS reply 24 may be encrypted.

Figure 5:
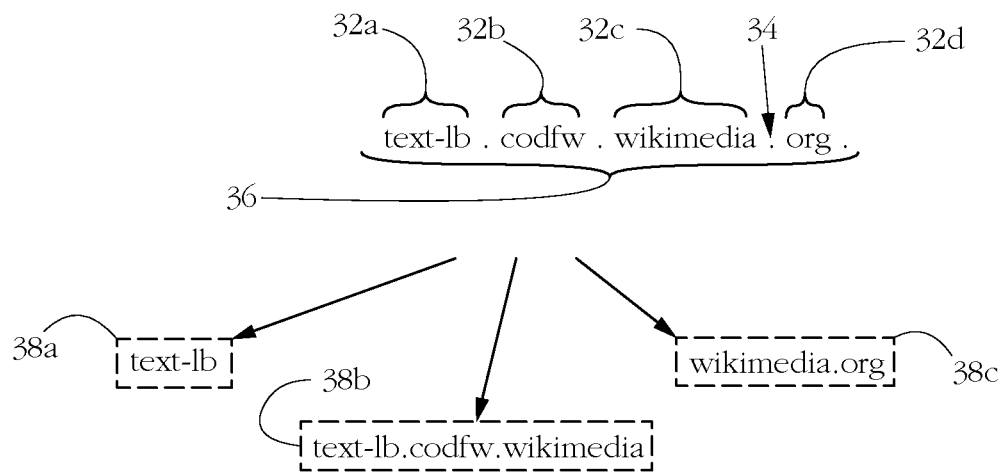
FIG. 5 shows an exemplary fully qualified domain name (FQDN) and a plurality of exemplary partially qualified domain names (PQDN) of an Internet domain, according to some embodiments of the present invention.

FIG. 5 shows an exemplary domain name of an Internet domain. The domain name may consist of a fully qualified domain name (FQDN) 36 that completely and unambiguously specifies the respective domain by way of an ordered sequence of tokens/labels 32*a-d* separated by a delimiter symbol 34 (in the illustrated example, a dot). A fragment of FQDN 36 comprising a subset/subsequence of the FQDN tokens 32*a-d* is commonly known as a partially qualified domain name (PQDN). Items 38*a-c* illustrate various exemplary PQDNs of FQDN 36. In contrast to FQDN 36, each PQDN 38*a-c* specifies the respective domain with some level of ambiguity, i.e., there may exist multiple FQDNs having the same characterizing PQDN.

Figure 6:
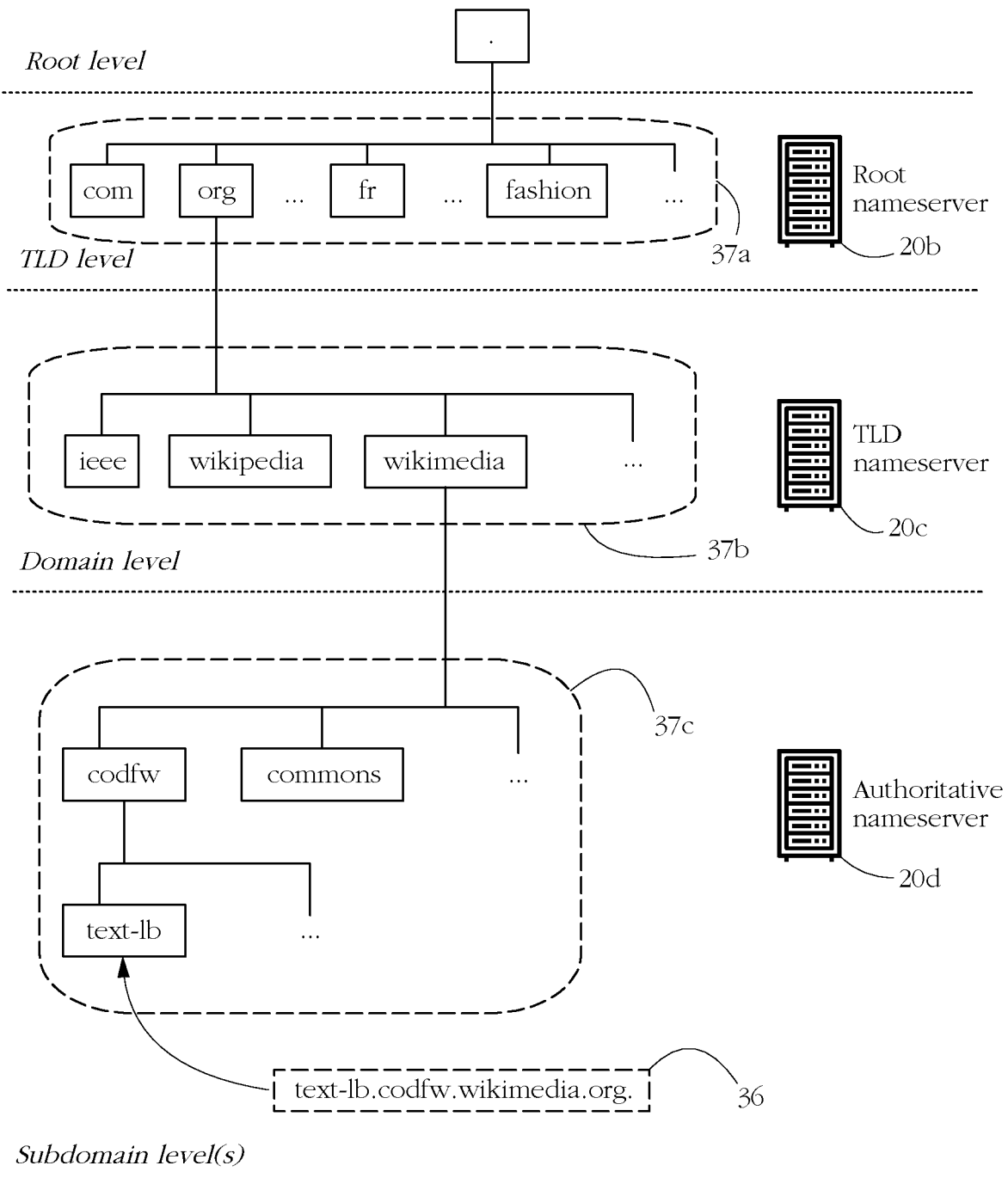
FIG. 6 shows an exemplary domain name space according to some embodiments of the present invention.

A domain name representation as a sequence of tokens (see FIG. 5) is consistent with a tree-like hierarchical representation of a domain name space as shown in FIG. 6, wherein each token 32*a-d* of FQDN 36 corresponds to a branch of a tree, and each instance of the delimiter (e.g., dot) corresponds to a branch point. The domain name hierarchy has several notable levels, comprising at least a root level ('.'), a top level domain (TLD) level comprising tokens such as com, net, fashion, tv, and country-indicative tokens such as ro, fr, etc., a domain level comprising tokens such as wikipedia, facebook, etc., and a subdomain level comprising various domain-specific prefix tokens. Assembling FQDN 36 from individual tokens is thus equivalent to walking the tree hierarchy from end-leaf to root, as illustrated in FIG. 6. For clarity, tokens characterizing a domain name at a TLD level (typically the last token of FQDN 36) will be herein deemed TLD tokens. Similarly, tokens characterizing the domain name at a domain level (typically the next-to-last token of FQDN 36) will be herein deemed domain tokens. Finally, all tokens preceding the domain token in FQDN 36 will herein be deemed prefix tokens.

A domain name service may be organized so that no single nameserver can single-handedly resolve a fully qualified domain name. Instead, the domain name space is divided into a plurality of authority zones, each authority zone resolved by a distinct nameserver. Typically, each authority zone comprises a selected subtree/branch of the domain name hierarchy, as illustrated by exemplary authority zones 37*a-c* in FIG. 6. In the illustrated example, nameservers 20*b-c-d* resolve domain names within authority zones 37*a-b-c*, respectively.

In some embodiments, resolving an FQDN to a corresponding IP address proceeds in an iterative fashion, each consecutive iteration progressing to a consecutive level of the domain name hierarchy. Each consecutive iteration may be determined according to a distinct token of FQDN 36. Each iteration may comprise sending a DNS query to a distinct nameserver, and in response, receiving a DNS reply specifying an IP address of another nameserver. Servers resolving the TLD level of a domain name, i.e., TLD tokens such as '.org', are herein deemed root nameservers (see e.g., root nameserver 20*b*). Servers resolving the domain name at a domain level, i.e., the domain token of FQDN 36, are herein deemed TLD nameservers (see e.g., TLD nameserver 20*c* resolving among domains of the '.org' top level domain). Servers resolving the subdomain level, i.e., the prefix token(s) of FQDN 36, are herein deemed authoritative servers for the respective domain (see e.g., authoritative server 20*d* resolving among subdomains of 'wikimedia.org'). In one example according to FIG. 6, resolving domain name 'text-lb.codfw.wikimedia.org' comprises sending a first DNS query to root nameserver 20*b*, and in response, receiving from nameserver 20*b* an IP address of TLD nameserver 20*c* responsible for resolving the authority zone of the '.org' top level domain. A next stage of iteration may comprise sending a second DNS query to TLD nameserver 20c and in response, receiving from nameserver 20c an IP address of authoritative nameserver 20d of the 'wikimedia.org' domain. Yet another stage of iteration may comprise sending a third DNS query to authoritative nameserver 20d and in response, receiving from nameserver 20d the IP address of the content server identified by FQDN 'text-lb.codfw.wikimedia.org'.

In some embodiments, queries transmitted in all steps of an iterative DNS resolution comprise the fully qualified domain name. In alternative privacy-enhancing embodiments, the DNS query sent in each iteration may comprise a distinct PQDN (e.g., a single token) and possibly additional characters such as a wildcard '*', among others. For instance, the PQDN sent to a selected nameserver may contain the respective FQDN stripped to just one token more than the authority zone of the respective nameserver. In the example in FIG. 6, a DNS query sent to root nameserver 20b may inquire about the PQDN '.org', while a DNS query sent to TLD nameserver 20c may inquire about the PQDN '*.wikimedia.org'.

In some embodiments, such iterative domain resolution is carried out by a specialized resolver nameserver 20a (FIG. 2), which may further manage a DNS cache comprising results of recent and/or popular DNS lookups. In such configurations, client devices 12a-f may transmit a single DNS query to resolver nameserver 20a, the respective query requesting resolution of a fully qualified domain name. Nameserver 20a may then perform cache lookups and/or carry out the required iterative DNS queries on behalf of the client. When the respective FQDN is fully resolved, nameserver 20a may return the IP address associated with the respective FQDN to the requesting client.

Figure 7:
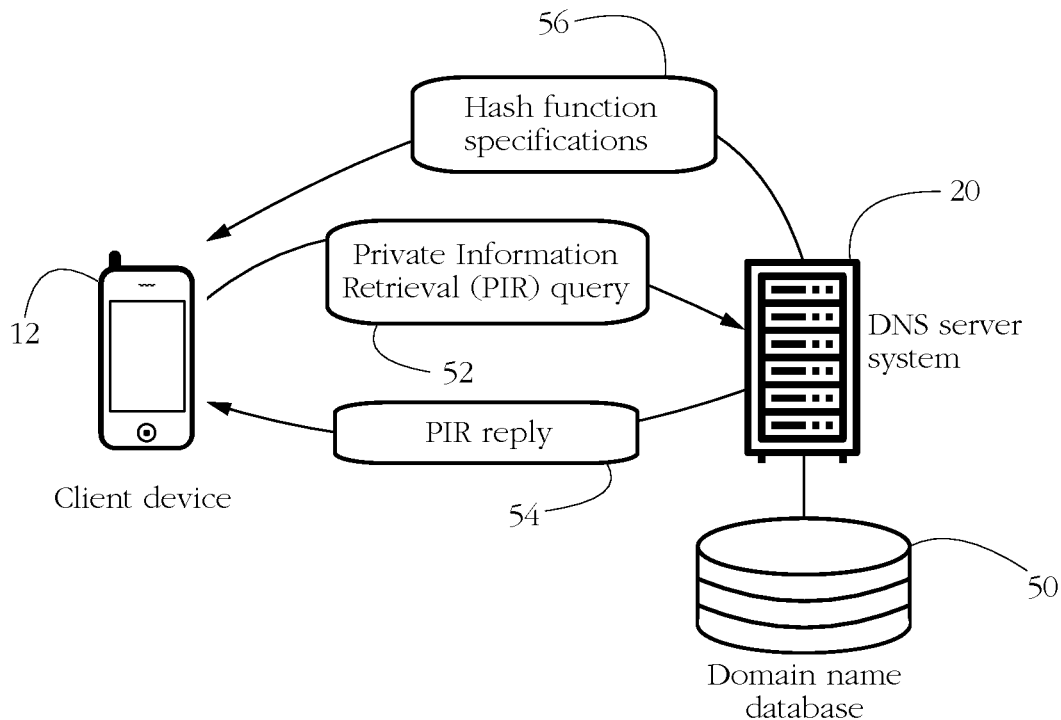
FIG. 7 shows a DNS transaction according to some embodiments of the present invention, the transaction comprising a private query and a private reply.

FIG. 7 illustrates an exemplary privacy-preserving DNS transaction according to some embodiments of the present invention. The transaction comprises a first party (e.g., a client) issuing a request for an item to a second party (e.g., a server) and the second party retrieves the requested item from a data repository/database, wherein the retrieval procedure is carried out without revealing the item to the second party. Stated otherwise, the server is unaware of which item was requested, but nevertheless retrieves the requested item from the repository. In one exemplary privacy-preserving transaction as detailed below, the request issued by the client is encrypted, and the server retrieves an encrypted version of the requested item, without decrypting the request. The privacy of the client is therefore preserved.

In some embodiments, privacy-preserving DNS transactions are carried out according to a private information retrieval procedure (PIR). The exemplary exchange illustrated in FIG. 7 comprises a client device 12 (which generically represents any of client devices 12a-f in FIG. 1) transmitting a private query (illustrated as PIR query 52) to DNS server system 20 and in response, receiving from server system 20 a private reply (illustrated as PIR reply 54).

In some embodiments, a PIR procedure uses homomorphic encryption to ensure the privacy of the exchange. Homomorphic encryption is a particular kind of encryption which allows performing certain calculations (e.g., additions and/or multiplications) on encrypted data, wherein decrypting a result of such calculations produces the same output as applying the respective calculations to an unencrypted version of the same data. Stated otherwise, if Enc(m)=c denotes a homomorphic encryption operation wherein m represents a plaintext message and c denotes its corresponding ciphertext, Dec(c)=m denotes a homomorphic decryption operation that recovers the respective message from its ciphertext, and Eval (F, $\{c_1, \ldots, c_k\}$)=C denotes a homomorphic evaluation procedure producing an encrypted ciphertext C by applying a function F to a set of ciphertexts $c_i$, then:

$$Dec(C)=F(m_1, \ldots, m_k), \quad [1]$$

wherein $m_i$=Dec($c_i$), i=1, . . . , k. In formal mathematical language, it is said that the encryption and decryption procedures of a homomorphic encryption scheme are homomorphisms between the plaintext space and ciphertext space.

Several homomorphic encryption schemes/cryptosystems are known in the art. Schemes that preserve the homomorphic property over any combination of additions and multiplications are commonly known as fully homomorphic. Examples include the Gentry-Sahai-Waters (GSW) scheme, among others. Other schemes/algorithms are homomorphic only over a certain type of operation, for instance only addition in the case of a Paillier scheme, and only multiplication in the case of a Rivest-Shamir-Adelman (RSA) scheme. Such schemes are known in the art as partially homomorphic. In contrast, ciphers that do not have the homomorphic property described above are herein deemed non-homomorphic. Examples of non-homomorphic ciphers include the Advanced Encryption Standard (AES) and other ciphers used in the Transport Layer Security (TLS) family of communication protocols.

In an exemplary PIR procedure using homomorphic encryption, the function F may stand in for a set of operations amounting to performing a database lookup. In a simple example, a server holds three elements in a database: D={a, b, c}. A client wants to retrieve the second element (i.e., 'b') without divulging that information to the server. The client may indicate the desired element using a lookup index, for instance a bitmap I which contains zeroes everywhere except at the position of the desired element within database D. In the current example, I={0, 1, 0}. The client may then homomorphically encrypt the respective bitmap and transmit it to the server. In turn, the server may apply a function F to the encrypted bitmap:

$$C=F[Enc(I)]=D*[Enc(I)]^T, \quad [2]$$

wherein * denotes matrix multiplication and T denotes transposition. The server then transmits the resulting encrypted vector C back to the client. The homomorphic property ensures that decrypting C produces the same result as applying the function F to the unencrypted bitmap I:

$$Dec(C)=F(I)=D*I^T=\{a,b,c\}*\{0,1,0\}^T=b \quad [3]$$

The client thus retrieves b while the server only sees encrypted bitmaps and performs all operations without decrypting information received from the client.

In some embodiments, DNS server system 20 is communicatively coupled to a domain name database 50 which stores a set of records indexed according to domain name. An index attached to each record may indicate a location of the respective record within the respective data repository, or otherwise enable a selective identification/retrieval of the respective record within/from database 50. In a simple example wherein data is organized in tabular form, each row may represent a separate record, and rows are indexed by distinct row numbers and/or labels. Each record may comprise a set of entries indicative of various characteristics of the respective domain. In one embodiment implementing a DNS lookup service, exemplary entries include an IP address of a computer forming a part of the respective domain and/or an IP address of a nameserver (see e.g., nameservers 20a-d in FIGS. 2 and 6). Other exemplary entries comprise domain registration data for the respective domain (e.g., owner identity data, billing data, owner contact data such as a street address, telephone number, email address, a domain name expiration date, an identifier of the current domain registrar, etc.). Yet other exemplary entries may include indicators of whether the respective domain belongs to a specific category or not, or an indicator of a category that the respective domain belongs to. For instance, an entry may indicate whether the respective domain is blacklisted/whitelisted, whether the respective domain is known to distribute fraudulent documents and/or unsolicited communication (spam), whether the respective domain is part of a botnet or engages in denial of service (DoS) attacks. Another exemplary entry may indicate whether the respective domain is located within a selected geographical area or sub-network (e.g., geofencing). Yet another exemplary entry may indicate whether the respective domain is owned or related to a selected commercial entity. Other examples will be discussed below.

In some embodiments, the index identifying each record is determined according to a domain name, thus enabling an association between the various entries of the respective record and a domain name. The respective domain name may be a FQDN or a PQDN. One exemplary index comprises a hash computed according to the respective domain name. A hash herein denotes a result of applying a hash function. A hash function is a particular kind of mathematical function that maps data of arbitrary size to numbers having a predetermined universal upper bound. Since character strings can be expressed as numbers, hash functions may also map any character string to a number, for instance to a 256-bit integer. Exemplary hash functions include H(n)=n mod m wherein n and m are integers, checksum hashes (e.g., cyclic redundancy check—CRC), as well as cryptographic hash functions such as the message digest hash family (e.g., MD5) and the secure hash family (e.g., SHA-3), among others. An index computed according to a result of applying a hash function is herein deemed a hash index.

Figure 8:
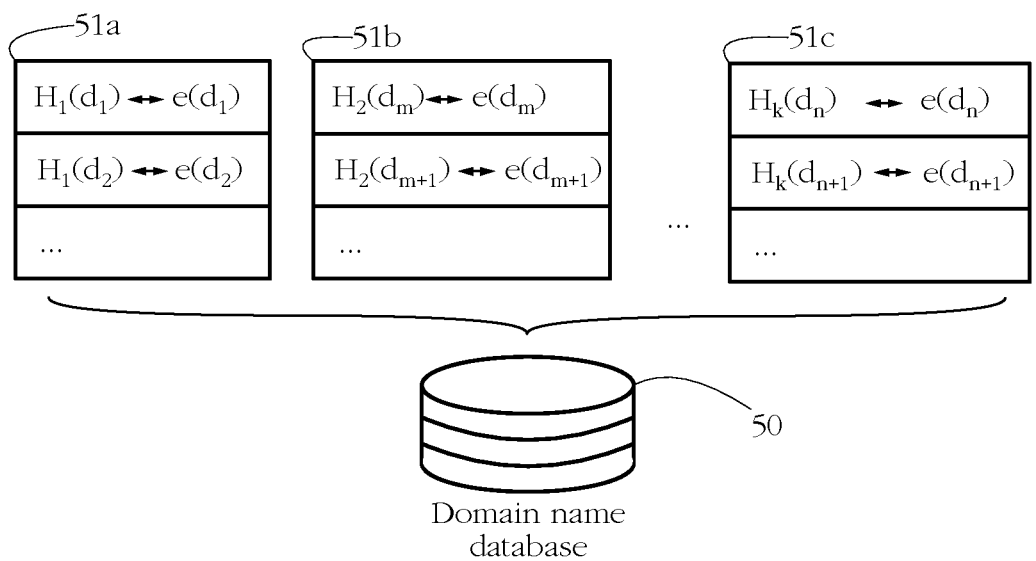
FIG. 8 illustrates exemplary contents of a domain name database according to some embodiments of the present invention.

In some embodiments, the index identifying a record of domain name database 50 is computed using a cuckoo hash scheme which employs a plurality of hash functions $H_1, \ldots, H_k$. An example of such hashing is illustrated in FIG. 8, wherein database 50 comprises a plurality of hash tables 51a-c. Each row of each hash table represents a separate record, indexed according to a respective domain name, denoted as $d_j$, j=1,2, . . . . Each record comprises at least an entry, denoted as $e(d_j)$, which may comprise for instance an IP address of the respective domain. In each hash table 51a-c, the index identifying each record is determined by applying a hash function to the respective domain name. However, each table 51a-c uses a distinct hash function to determine the respective indices. In an exemplary cuckoo hash scheme, records are inserted serially, by computing an index for each record using a first hash function. When the row indicated by the respective index is empty, the current record is inserted into that row. If the respective row is already occupied, another hash index is computed according to the second hash function, etc. When indices calculated according to all hash functions point to rows which are already occupied, one of the resident records is displaced by the current record. The previous occupant of the respective row is then placed at an alternative location (i.e., at an index computed using a different hash function), possibly displacing another record. The process continues recursively until all records find a place within one or the other hash table. However, it is possible for this insertion process to fail, for instance by entering an infinite loop. In this case, the hash tables are rebuilt using a new choice of hash functions.

Figure 9:
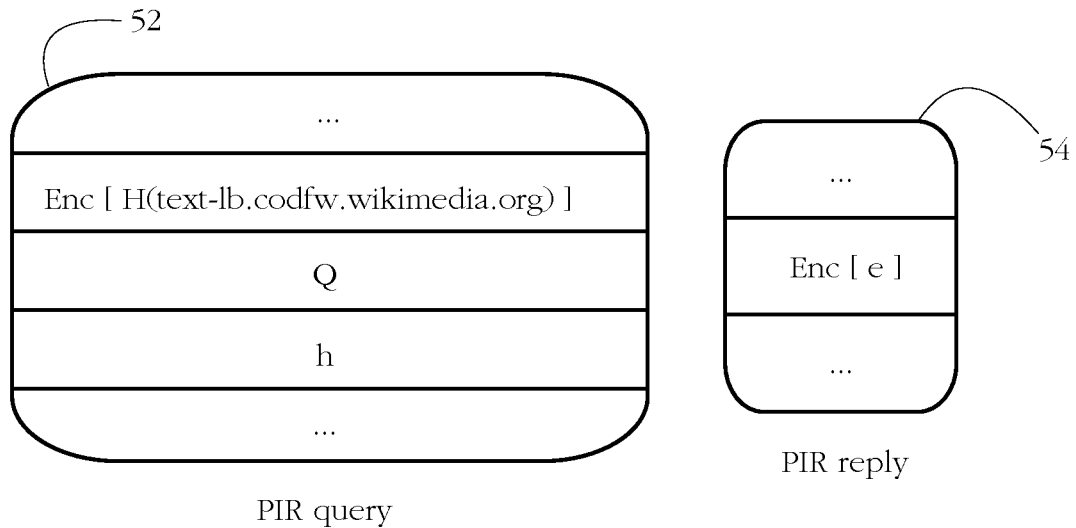
FIG. 9 illustrates an exemplary private information retrieval (PIR) query and an exemplary PIR reply according to some embodiments of the present invention.

FIG. 9 illustrates exemplary contents of PIR query 52 and PIR reply 54 according to some embodiments of the present invention. PIR query 52 may comprise a ciphertext including an encryption of an index identifying a selected record of domain name database 50. In the example in FIG. 9, the index comprises a hash of a domain name. In an embodiment that uses cuckoo hashing, for each domain name, client device 12 may send out a plurality of encrypted hash indices, each computed according to a distinct hash function $H_j$. Such encrypted hash indices may be packaged into individual PIR queries or bundled together into a single PIR query.

In some embodiments, PIR query 52 further comprises an indicator (herein denoted as h) of a hash function used to compute the respective hash index. For instance, h may comprise a software version number or some other parameter value allowing DNS server system 20 to determine whether the hash function(s) used by the respective client coincide with the ones used for building up the hash tables of domain name database 50. More details on checking the consistency of hashing are given below, in relation to FIG. 13.

When database 50 includes a record identified by the respective index, PIR reply 54 may return a ciphertext comprising an encryption of at least an entry e of the respective database record. When no such record exists in database 50, some embodiments may reply with an encryption of a predetermined dummy entry (e.g., a predetermined symbol indicating that database 50 currently does not have a record with the requested index).

Figure 10:
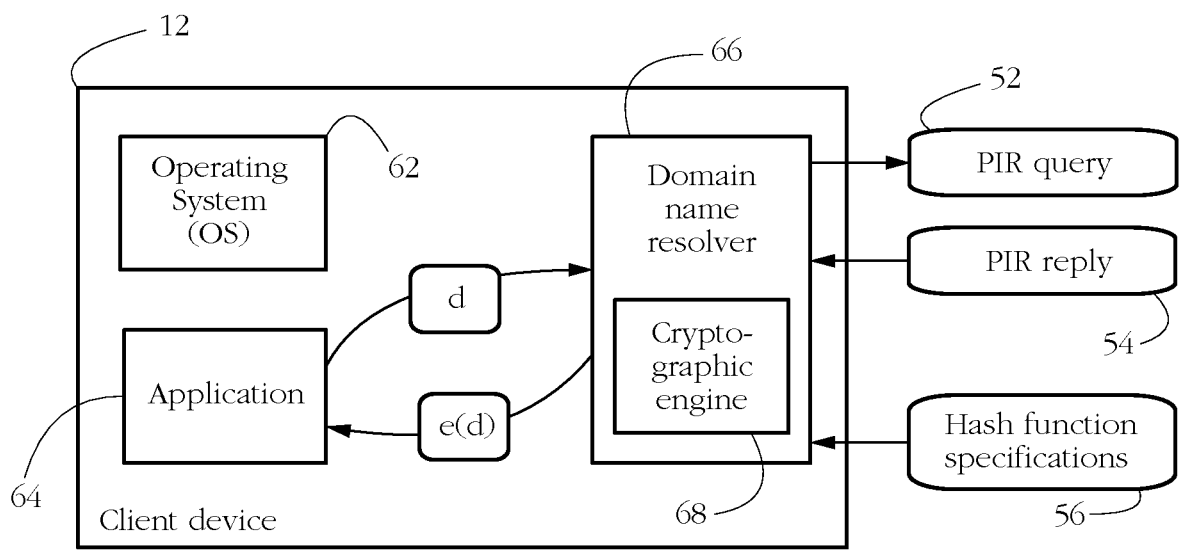
FIG. 10 shows exemplary components executing on a client system according to some embodiments of the present invention.

FIG. 10 shows exemplary components executing on a client device 12 according to some embodiments of the present invention. Such software may include an operating system (OS) 62, which may be any widely available operating system such as Microsoft Windows®, MacOS®, Linux®, iOS®, or Android®, among others. OS 62 provides an interface between the hardware of client device 12 and a set of applications including a client application 64 and a domain name resolver 66, among others. Client application 64 generically represents any computer program such as a word processing, spreadsheet, image processing, gaming, electronic communication, web browsing, and social media application, among others. In some embodiments, application 64 provides computer security services to the respective client system, for instance by filtering/blocking traffic to/from certain Internet domains, determining whether incoming and/or outgoing electronic communications comprise malicious code or unsolicited content (spam), etc.

Application 64 may connect to content server 16 to exchange data, for instance via a set of HTTP requests. As part of such exchanges, application 64 may transmit an indicator of a domain name d to domain name resolver 66 and in response, receive a domain name database entry e(d) characterizing the respective domain from resolver 66. In a simple DNS lookup example, e(d) may comprise an IP address of domain d. In another example, e(d) may comprise a set of registration data for domain d (e.g., an identity of an owner of the respective domain). In yet another example, e(d) may comprise an indicator of whether accessing domain d exposes the respective client to a computer security threat, for instance whether domain d is known to distribute fraudulent documents. In general, e(d) may comprise any data stored in domain name database 50 and indexed under the domain d.

In some embodiments, domain name resolver 66 is configured to engage in privacy-preserving DNS transactions with DNS server system 20 (see also FIG. 8). As such, resolver 66 may formulate and send out PIR query 52 according to a domain name received from application 64. Resolver 66 may further receive PIR reply 54, extract the cleartext data entry e(d), and forward it to application 64. Domain name resolver 66 may further comprise a cryptographic engine 68 configured to execute encryption and/or decryption operations. In some embodiments, engine 68 implements a set of homomorphic encryption algorithms/procedures. Cryptographic engine 68 may be implemented in software, hardware, or a combination thereof.

Figure 2:
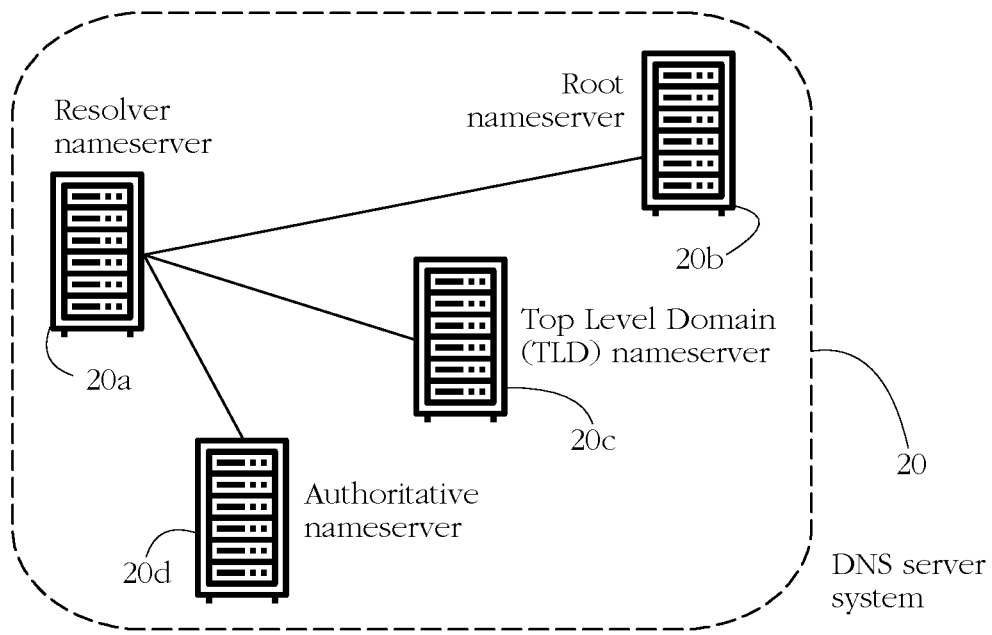
FIG. 2 shows an exemplary domain name service (DNS) server system comprising a plurality of communicatively coupled nameservers according to some embodiments of the present invention.

In an alternative embodiment to the one illustrated in FIG. 10, domain name resolver 66 may execute in part or entirely on a machine distinct from client device 12, for instance on router 14 or another gateway device connecting client device 12 to extended network 15 (see FIG. 1), or on resolver nameserver 20a (FIG. 2).

Figure 11:
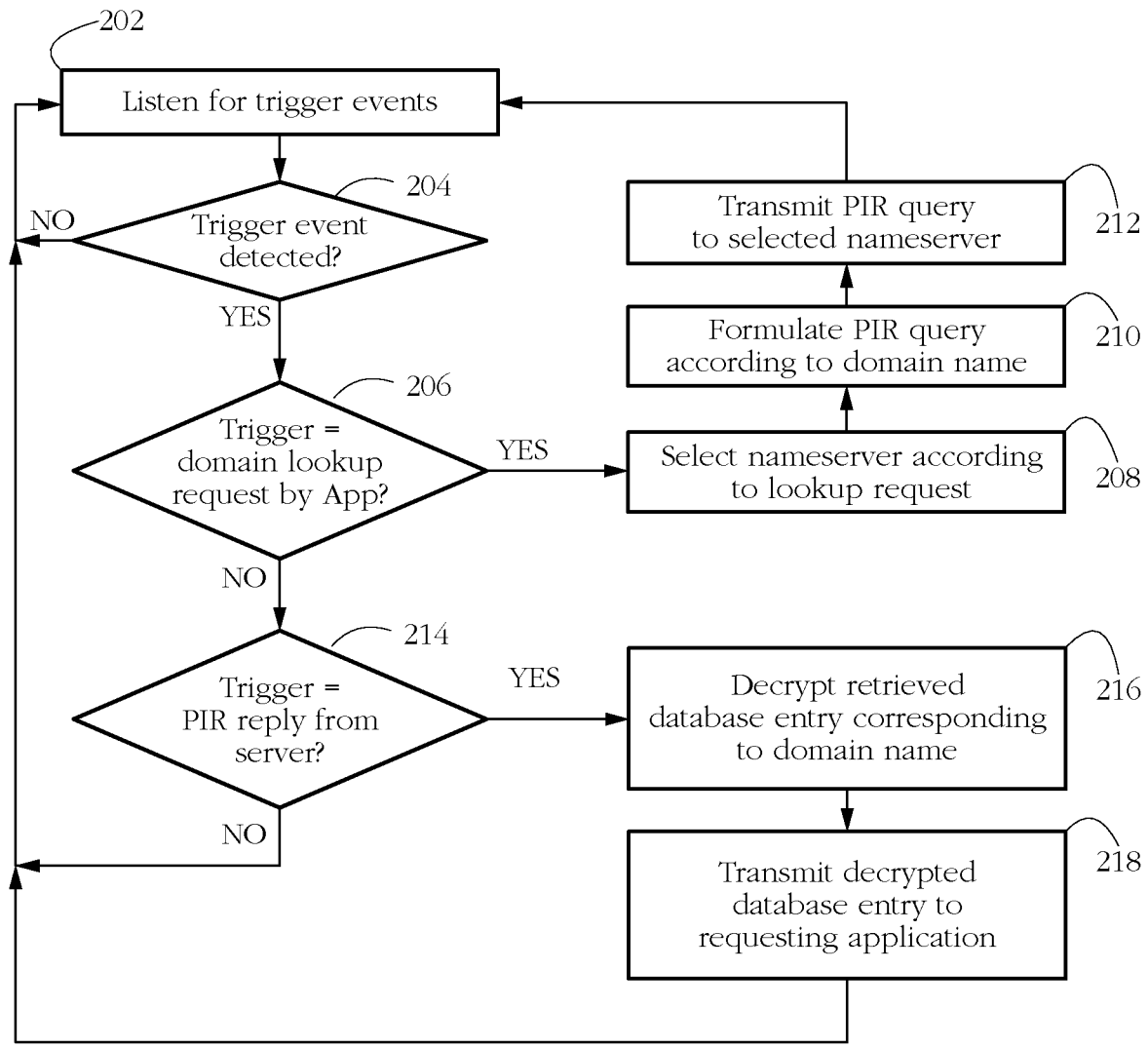
FIG. 11 shows an exemplary sequence of steps performed by the client system DNS resolver according to some embodiments of the present invention.

FIG. 11 shows an exemplary sequence of steps performed by domain name resolver 66 according to some embodiments of the present invention. The illustrated resolver may wait for trigger events such as communications received from application 64 and/or remote servers. When an event is detected, a course of action is determined according to a type of event. When the detected event comprises a domain lookup request from application 64 (step 206 returns a yes), then in a step 208 some embodiments may select a nameserver according to the received lookup request. In some embodiments, distinct types of domain name services may be supplied by distinct servers. For instance, some nameservers may be dedicated to returning IP addresses, while others may return database entries related to computer security. Furthermore, when the domain name service comprises determining the IP address of a selected domain, some embodiments may employ PIR only when querying selected nameservers (see details below).

Next, in a step 210, resolver 66 may formulate at least one PIR query 52 according to the respective domain name. Step 210 may comprise, among others, applying a selected hash function to the respective domain name and employing cryptographic engine 68 to encrypt the result of hashing, for instance using a homomorphic encryption procedure/algorithm. Engine 68 may use any homomorphic encryption procedure known in the art, for instance an encryption algorithm of a fully homomorphic encryption scheme such as Gentry-Sahai-Waters (GSW). Some such procedures comprise further data manipulations aimed at reducing a computational load on the client and/or server side, as detailed for instance in Gentry C., Halevi S. "Compressible FHE with Applications to PIR", In: Hofheinz D., Rosen A. (eds) Theory of Cryptography, TCC 2019, Lecture Notes in Computer Science, vol 11892, Springer, Cham. Encrypted PIR queries are then transmitted to the selected nameserver.

When the trigger event comprises receiving PIR reply 54 from a server, in a step 216 resolver 66 may use cryptographic engine 68 to decrypt the ciphertext(s) included in reply 54, thus recovering a database entry (e.g., an IP address) associated with a queried domain name. When domain name database 50 does not contain entries associated with the respective domain name, decrypting the respective ciphertext(s) may produce a dummy message indicative of failure. A further step 218 may transmit the result of the decryption procedure to application 64. Step 216 uses a homomorphic decryption procedure/algorithm, for instance fully homomorphic as described in Gentry C., Halevi S. "Compressible FHE with Applications to PIR", In: Hofheinz D., Rosen A. (eds) Theory of Cryptography, TCC 2019, Lecture Notes in Computer Science, vol 11892, Springer, Cham.

Figure 12:
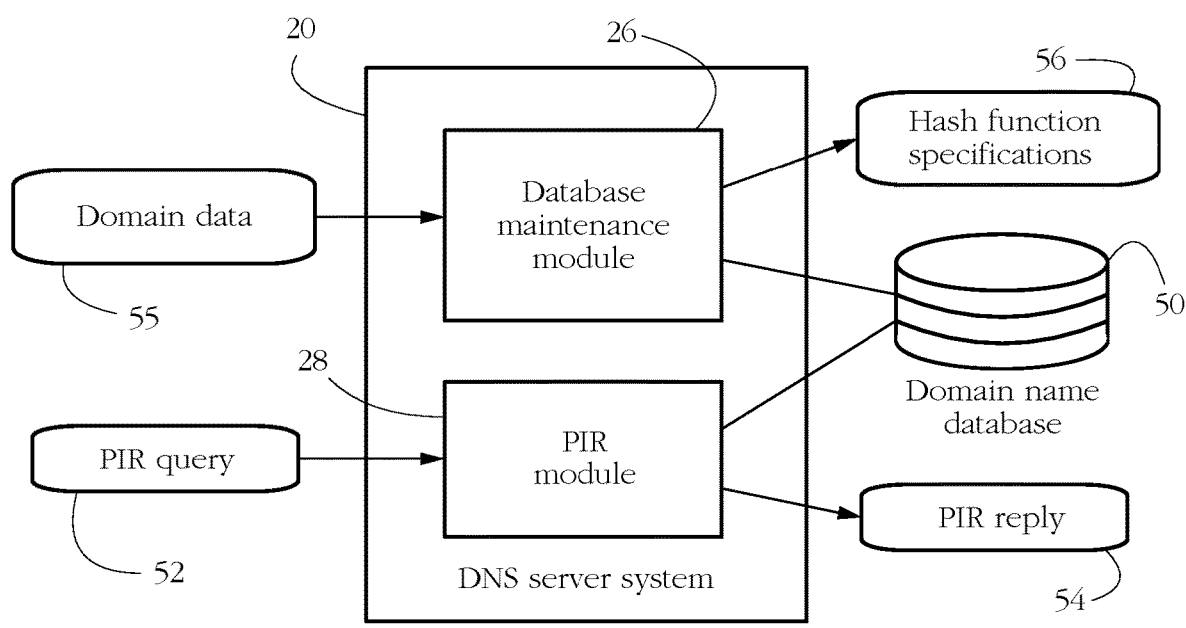
FIG. 12 illustrates exemplary components executing on a DNS server system according to some embodiments of the present invention.

FIG. 12 illustrates exemplary components of DNS server system 20 according to some embodiments of the present invention. The illustrated components may execute on a single physical machine or on distinct communicatively coupled machines. Server system 20 generically represents a set of nameservers as illustrated in FIG. 2.

Figure 13:
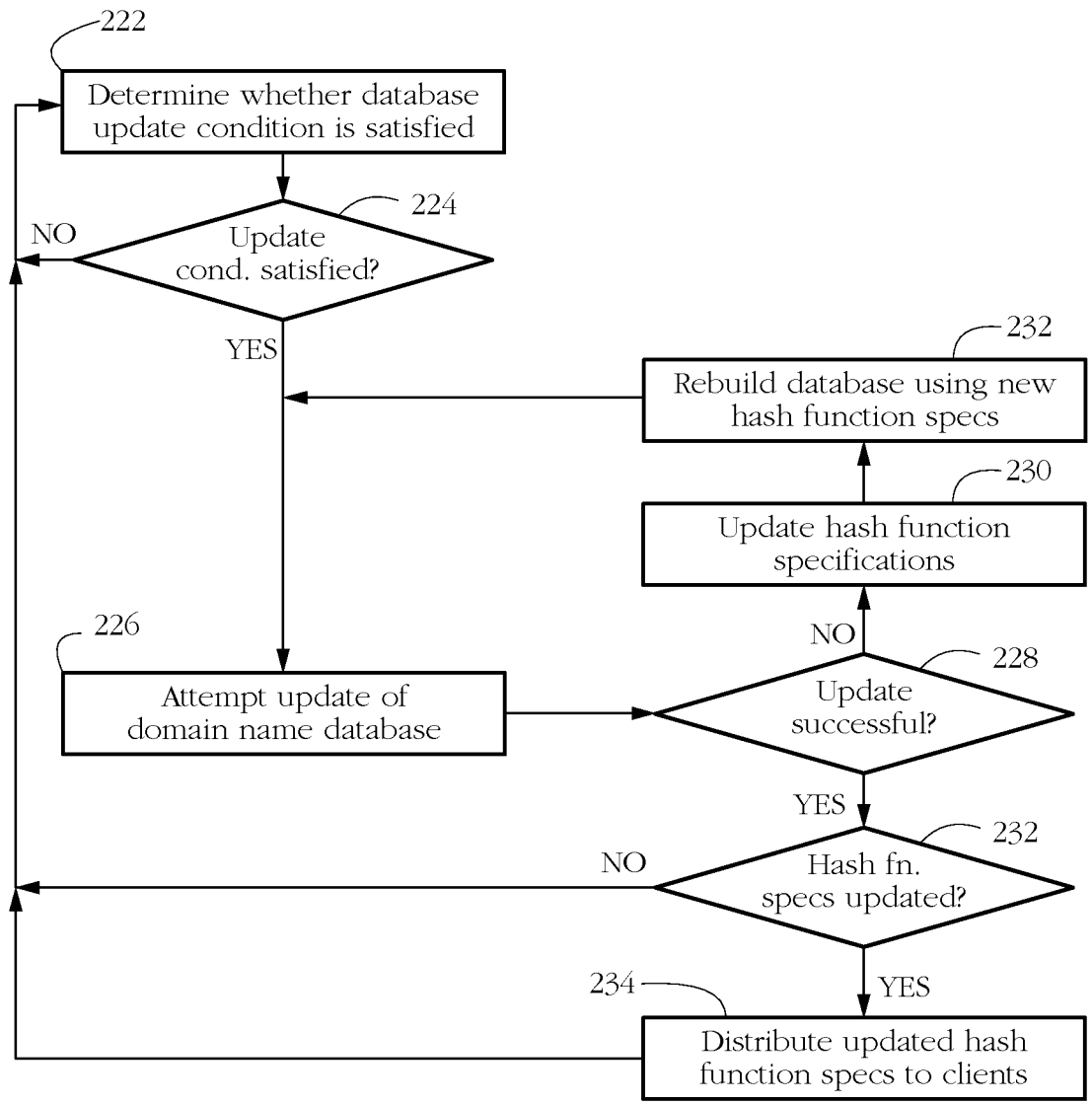
FIG. 13 shows an exemplary sequence of steps carried out by the DNS server database maintenance module according to some embodiments of the present invention.

In some embodiments, a database maintenance module 26 is configured to keep domain name database 50 up to date by inserting records corresponding to new domain names, effecting changes to selected records (e.g., changing domain registration data, changing a cluster assignment of the respective domain, taking a respective domain off a blacklist, etc.), and/or deleting expired records. An exemplary operation of module 26 is shown in FIG. 13. In a sequence of steps 222-224, module 26 may check whether a database update condition is satisfied. Some embodiments may perform database updates according to a schedule (e.g., every hour) or on demand. In an alternative embodiment, an update agent may accumulate incoming domain data 55 in a queue and determine that an update condition is satisfied when the queue is full. When the update condition is satisfied, a step 226 may attempt an update of database 50, for instance by inserting a set of new records. Step 226 may comprise calculating a hash index, for instance by applying a hash function to each new domain name, and inserting a record into a table row with the newly calculated index. However, such insertion operations may fail, for instance in the case of a hash collision, i.e., when two distinct domain names hash to the same index. In embodiments using a cuckoo hash scheme, the conflict may be resolved by calculating another index using a second hash function etc. Even in such embodiments, inserting a particular record may not be possible because of multiple hash collisions. Such situations may require choosing a new set of hash functions and re-indexing database 50 using the new hash functions (steps 230-232 in FIG. 13).

In response to a successful database update, when hash functions have changed, a step 234 may distribute a set of updated hash function specifications 56 to clients (see e.g. FIGS. 7, 10, and 12). Step 234 may thus ensure consistency of hashing, i.e., that all clients formulate PIR requests consistently using the version of hash functions that were used in indexing database 50.

In some embodiments, a PIR module 28 of DNS server system 20 is configured to carry out an encrypted lookup into domain name database 50 according to query 52. The term 'encrypted lookup' herein refers to retrieving a record from database 50, the record indicated by an index included in encrypted form in PIR query 52, without decrypting the respective index. The encrypted lookup procedure may comprise performing a set of operations such as additions and multiplications directly on encrypted data to produce an encrypted result, as exemplified by Eqn. [2] above. An encrypted lookup therefore does not encompass first decrypting the query to produce a cleartext index and looking up the cleartext index into the respective database, as may be done for instance in conventional versions of encrypted DNS such as DNS-over-HTTPS.

Figure 14:
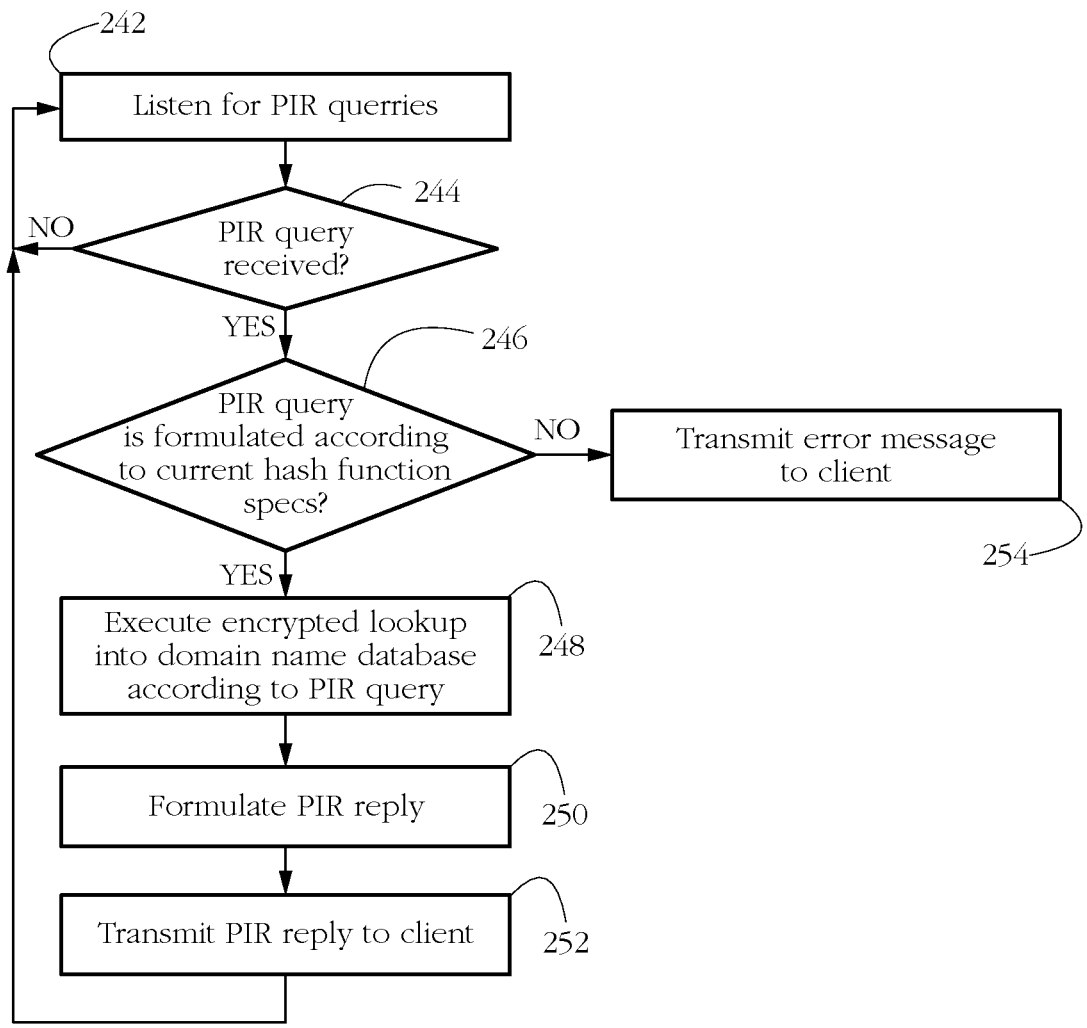
FIG. 14 shows an exemplary sequence of steps performed by the DNS server PIR module according to some embodiments of the present invention.

An exemplary operation of PIR module 28 is illustrated in FIG. 14. A sequence of steps 242-244 may listen for incoming PIR queries. When a query is received, a step 246 may check for consistency of hashing. Stated otherwise, step 246 may determine whether the respective query was formulated according to the same hash function specifications as those used to index domain name database 50. When no, in a step 254, DNS server system 20 may return an error message to the respective requesting client. Some embodiments may further push updated hash function specifications 56 to the respective client.

In response to a determination that hashing is consistent, a step 248 executes an encrypted lookup into database 50 according to PIR query 52. Step 248 may employ any method known in the art, for instance as described in Gentry C., Halevi S. "Compressible FHE with Applications to PIR", In: Hofheinz D., Rosen A. (eds) Theory of Cryptography, TCC 2019, Lecture Notes in Computer Science, vol 11892, Springer, Cham. A sequence of steps 250-252 may then formulate PIR reply 54 and transmit reply 54 to the respective client device.

A variety of domain name services may be implemented in a privacy-preserving manner as described above. Some exemplary use case scenarios include:

Resolving Domain Names to Addresses (IP Address Lookup)

One application of the systems and methods described herein is in performing a DNS lookup, i.e., returning an IP address associated with a selected domain name. In such embodiments, domain name database 50 may store a set of IP addresses indexed by domain name. PIR query 52 may include an encryption of an index determined by hashing the respective domain name and possibly other data (e.g., an encoding of a question Q, see e.g. FIG. 9). In response, DNS server system 20 may return a PIR reply 54 comprising an encryption of the respective IP address. The client (or another machine in communication with the respective client) may then decrypt and use the respective IP address for routing electronic communications (e.g. web browsing).

Figure 15:
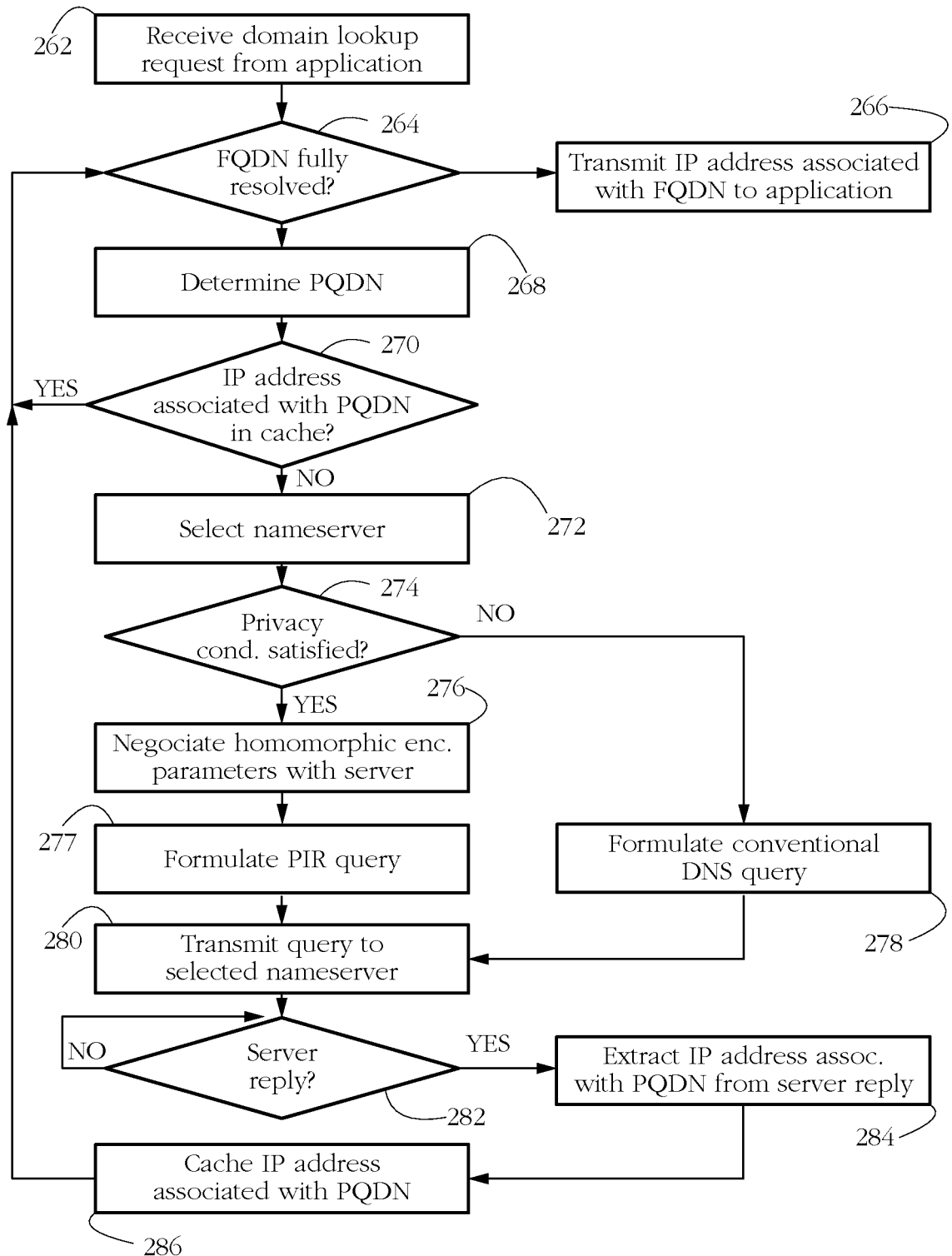
FIG. 15 shows an exemplary sequence of steps performed by the client DNS resolver to carry out a DNS lookup according to some embodiments of the present invention.

An exemplary sequence of steps carried out by domain name resolver 66 in an embodiment configured to perform domain name resolution (mapping domain names to IP addresses) is shown in FIG. 15. To optimize DNS lookup, some embodiments may maintain a local cache storing previously resolved IP addresses of TLD and/or authoritative nameservers. In response to receiving a request to resolve a selected domain name, some embodiments may iterate through consecutive levels of the domain name hierarchy. When the respective FQDN is not yet fully resolved to an IP address, a step 268 may determine a PQDN of the respective domain name. The PQDN may comprise a part of the FQDN specified up to a selected level of the hierarchy (for instance up to the TLD level, e.g., '.org' (see FIG. 6). In a step 270 resolver 66 may check whether the respective PQDN has been previously resolved by performing a cache lookup. When yes, the cache may hold an IP address for a nameserver that can resolve the next level of FQDN 36. When no, a step 272 may select a nameserver to resolve the current PQDN. In one example wherein the PQDN is '.org', the selected nameserver may be root nameserver 20b, etc.

Some embodiments rely on the observation that PIR procedures are computationally expensive, both in processor load and communication size. Furthermore, as shown above in relation to FIG. 6, a typical DNS lookup may require multiple iterative queries, e.g., first to a root nameserver, then to a TLD nameserver, then eventually to an authoritative server. Stated otherwise, a single DNS lookup may multiply the cost of a PIR procedure manifold. Further complicating the matter is the fact that DNS lookups are relatively frequent, for instance accessing a single webpage may comprise multiple successive DNS lookup operations.

Some embodiments further rely on the observation that some FQDNs are more privacy-sensitive than others. For instance, users may not be as concerned by revealing selected parts of their browsing history (e.g., visiting online news or reference sites such as Wikipedia, among others), as opposed to other parts (e.g., visiting an adult content site). Furthermore, some parts of a FQDN may be more privacy-sensitive than others. For instance, using the example in FIG. 6, knowing that a user wants to access the .org top level domain is much less informative or privacy concerning than knowing that the user is actually trying to access wikimedia.org.

To mitigate some of the computational costs incurred by PIR, some embodiments therefore deliberately use PIR only for a subset of DNS queries. Determining whether to use PIR or not may comprise determining whether a privacy condition is satisfied, i.e., determining whether a current query is privacy-sensitive or not. An exemplary step 274 in FIG. 15 evaluates a privacy condition. When the current query is considered privacy-sensitive (YES branch), a sequence of steps 276-277 may formulate the current query using homomorphic encryption (PIR). Otherwise, the current query may be carried out using conventional DNS.

Some embodiments determine whether the privacy condition is satisfied according to the authority zone of the selected nameserver. For instance, some embodiments only transmit PIR queries to TLD nameserver(s) 20c and/or authoritative nameserver(s) 20d, while queries addressed to root nameserver(s) 20b are formulated using conventional DNS. Stated otherwise, such embodiments resolve TLD tokens of FQDN 36 via conventional (non-private) DNS queries, and domain and/or prefix tokens using PIR.

Some embodiments of resolver 66 determine whether the privacy condition is satisfied according to at least one of the tokens of FQDN 36. For instance, resolver 66 may use conventional (i.e., non-PIR) DNS queries to resolve selected PQDN's, e.g., 'google.com', 'wikipedia.org', 'amazonaws.com', etc., and PIR queries to resolve other PQDN's such as 'facebook.com', 'pornhub.com', etc. Such embodiments rely on the observation that some online activities (e.g. conducting a Google search, accessing a news site, looking up the weather forecast or the sports scores, etc.) may be less of a privacy concern than others (e.g., accessing adult content, streaming a movie, accessing a selected e-commerce, online banking, or social media portal, etc.). In another example, knowing that a user accesses a cloud computing service (e.g., Amazon Web Services™ from Amazon, Inc., or Microsoft's Azure™) may not be very informative or privacy-concerning, since the respective domain may host thousands of different subdomains. To enable selective PIR querying, some embodiments maintain a blacklist of PQDN's considered privacy-sensitive and/or a whitelist of PQDN that may be searched using conventional DNS. An exemplary whitelist may comprise search engine domains, news domains, online advertising and/or other content distribution domains, and domains providing various cloud computing services (file hosting, infrastructure as a service, etc.), among others. Step 274 may then comprise looking up the current PQDN/domain name token in the whitelist and decide to send a conventional query when the respective PQDN/token is on the whitelist, and a PIR query otherwise. Alternatively, resolver 66 may look up a blacklist and decide to send a PIR query when the respective PQDN/token is on the blacklist, and a conventional DNS query otherwise.

Selective PIR querying may also be carried out at subdomain level. Some embodiments rely on the observation that in cases where leaking the domain-level PQDN may not constitute a particular privacy concern (e.g., google.com), leaking some subdomain token(s) may be problematic. For instance, 'www.google.com' may be less privacy-sensitive than 'meet.google.com'. Therefore, some embodiments maintain a whitelist and/or blacklist of prefix tokens and/or FQDNs and determine whether to query the respective authoritative server using PIR or conventional DNS. A simple embodiment may use conventional DNS queries to resolve the 'www' subdomain, and PIR queries otherwise.

Table 1 gives a few more examples of FQDNs and their associated privacy issues.

TABLE 1

| FQDN | Privacy issue | Privacy-sensitive token |
|---|---|---|
| time-ios.apple.com | Reveals that the user owns an iOS device, and the subdomain time-iOS is critical for its functionality. | prefix |
| ps4.update.playstation.net | Reveals that the user owns a Playstation ® model 4 game console. An attacker having the information can deploy a specific exploit. | domain and prefix |
| playstation.com.edgekey.net | Similar to above, but the sensitive information is in the subdomain (Edgekey is a content distribution network) | prefix |
| auth.tesla.com | Reveals that the user owns a Tesla ® car that syncs information with the cloud. | domain and prefix |
| antv-26-sony-bravia4kgbatv3-505003007.eu.api.amazonvideo.com | Subdomain reveals the specific device on which the user is watching movies. | prefix |
| trip.uber.com | Reveals that the user may be leaving/coming home soon. | domain |
| presence.grindr.com | May reveal the user's sexual orientation | domain |

When step 274 determines that a condition is satisfied for using PIR, in a step 276 resolver 66 may negotiate a set of homomorphic encryption parameters (e.g., keys, shared secrets, nonces, etc.) with server system 20. Some embodiments generate a private-public key pair, or and encryption-decryption key pair using a homomorphic encryption scheme. Then, a step 277 may formulate PIR query 52, e.g., by hashing the respective PQDN and encrypting the respective hash and possibly other data such as an indicator of a question Q (see FIG. 9) using a public key of the negotiated pair.

In cases when step 274 determines that the condition for using PIR is not satisfied, some embodiments may formulate a conventional DNS query (see FIGS. 3-4). Step 278 may further comprise negotiating a pair of session encryption keys under a DNS over HTTPs protocol, for instance, and encrypting the respective DNS query using a public key of the key pair. In some embodiments, both conventional and PIR queries are encrypted and sent over a protocol such as DNS over HTTPs. Such strategies may benefit from other features of said protocol, such as ensuring the integrity of the respective transmission. However, the PIR query comprises an extra layer of encryption compared to a conventional DNS query, the extra layer amounting to the homomorphic encryption enabling PIR. The layer of encryption corresponding to DNS over HTTPs or similar protocols is removed by the server. Nevertheless, while such decryption produces a cleartext version of the conventional DNS query, the server does not remove the homomorphic encryption layer from the PIR query, so the PIR query remains unreadable by DNS server system 20.

Having transmitted the query to the appropriate nameserver, in a step 282 resolver 66 may wait for a reply from the respective server. A further sequence of steps 284-286 may extract the IP address associated with the current PQDN from the server's reply, and may cache the respective IP address for further use. The respective IP address may comprise an address of a nameserver of the fully resolved IP address associated with the current FQDN. When the server's reply comprises PIR reply 54, step 284 may comprise decrypting the enclosed IP address using a homomorphic decryption procedure.

Some embodiments implement further optimizations to mitigate the substantial computational cost of PIR. One such example comprises reducing the size of domain name database 50 by dividing it into subunits/buckets, according to a total count of records and/or according to a desired lookup performance and/or desired privacy level. In such embodiments, instead of searching the full database of domain names, the server will only look within the bucket(s) holding a record of the respective domain. Smaller buckets enable a larger decrease in the lookup time, but at the same time provide less privacy because the identity of the respective domain is less uncertain. An exemplary bucket size that may offer a compromise between speed and privacy is $2^{16}=65536$, i.e., the respective bucket my allow resolving among at most 65536 distinct domain names. Each bucket may further store a plurality of hash tables as described above in relation to FIG. 8. Individual buckets may be operated by distinct computer systems, allocated to distinct processor cores of the same computer, etc.

Some embodiments may then use a hash function (e.g., a variant of the Fowler-Noll-Vo hash such as FNV-1) to identify the bucket holding the respective record. The output of the hash function may be truncated to the number of buckets by applying a modulo operation. On the server side, an exemplary bucket index may be computed as:

$$I^B(d,Q)=H^B([Q,d]) \bmod N^B, \qquad [4]$$

wherein d and Q denote a domain name and a question (e.g., A vs. AAAA), respectively, $H^B$ denotes the hash function used for bucketing, $N^B$ denotes the bucket count, and [Q d] denote a concatenation of Q and d. An artisan will understand that the illustrated manner of calculating the bucketing index is meant only as an example, and is not limiting the scope of the present invention.

For each domain name in database 50, database maintenance module 26 may compute $I^B$ and place the respective record in the bucket with index $I^B$. Placing the record may comprise applying a cuckoo hashing scheme to find a location for the respective record within one of a plurality of hash tables, etc., as described above. In turn, on the client side, resolver 66 may compute $I^B$ and attach it to PIR query 52. The bucket index may be sent as cleartext or encrypted. When receiving PIR query 52, server 20 may determine the bucket according to query 52 and then perform PIR according to a content of the respective bucket to produce PIR reply 54.

Computer Security and Analytics Applications

Some embodiments may be adapted to computer security and data analytics applications. In such use case scenarios, domain name database 50 stores records indicating membership of a respective domain in a particular class or category of domains. In some embodiments, categories may have relevance to computer security. For instance, a category may comprise domains characterized by distributing adult content. Another exemplary category comprises a blacklist of domains known to engage in fraudulent activities. Another exemplary category comprises domains characterized by participating in denial of service attacks (e.g., members of a particular botnet).

Other categories may be relevant to various aspects of data analytics. For instance, domains may be grouped into classes/categories according to content (e.g., gaming, news, reference, education, etc.). Other grouping/classification criteria may include ownership and/or commercial relationships. For instance, all domains owned by the same corporation or by members of the same conglomerate or alliance of companies may be grouped together into a distinct domain category. Another classification criterion comprises membership in a particular online activity. For instance, all domain names associated with a particular online game and/or with games produces by a particular game maker may be grouped together in a distinct category. Yet another classification criterion may comprise geolocation: domains from specific geographical regions, countries, etc. may be grouped together. Other exemplary criteria may comprise domain age/time of first registration.

Figure 16:
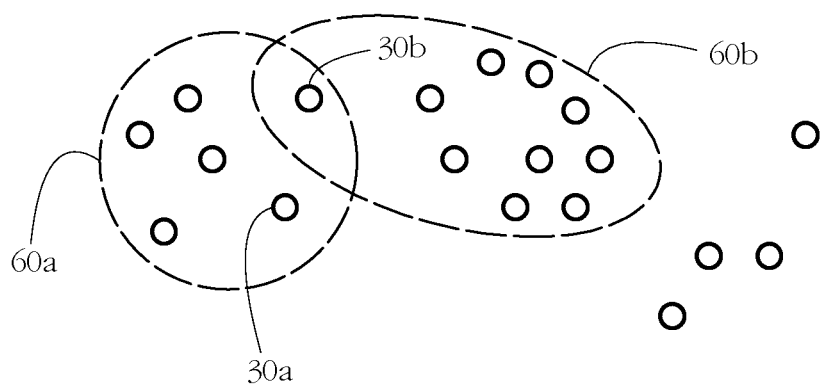
FIG. 16 shows an exemplary set of domains grouped into clusters according to some embodiments of the present invention.

In yet another example of classification, domains may be grouped into clusters according to shared characteristics or other type of inter-domain similarity. FIG. 16 shows a set of domains 30*a-b* and a set of clusters 60*a-b* according to some embodiments of the present invention. Cluster membership need not be exclusive; in the example of FIG. 16, domain 30*b* belongs to both clusters 60*a-b*. In some embodiments, the similarity of two domains may be evaluated according to a hyperdistance separating the two domains in an N-dimensional abstract feature space. However, similarity need not be based on domain features per se. In one such example, two domains may be considered similar when they frequently appear together in sequences of DNS queries; two such domains may be placed in the same cluster. In another example, clusters may be automatically produced by a neural network classifier using an unsupervised learning algorithm. Individual clusters may or may not amount to distinct domain categories. For instance, a 'malicious' domain category may include multiple clusters, wherein each cluster may comprise domains from a distinct botnet.

Domain clustering and/or classification per se (i.e., grouping domains into categories or clusters) goes beyond the scope of the present description, and may be achieved using any method known in the art of data mining. The present description will focus on accessing a pre-existing classification via PIR. In some embodiments, a record stored in domain name database 50 may comprise a boolean value indicating whether a domain belongs to a particular category or not. Alternatively, a record may comprise a label or other identifier of a category/cluster that the respective domain belongs to. Such records may be accessed using the PIR query and reply mechanism outlined above. In some embodiments, PIR query 52 comprises an encryption of an index into database 50 (e.g., a hash of a domain name), while PIR reply 54 may comprise a ciphertext encoding the database entry indicative of a category/cluster membership of the respective domain.

Some embodiments may employ the bucketing strategy described above in relation to DNS lookup to speed up the server's response in security and/or analytic applications as well. Individual buckets may correspond to individual security categories, such as malware, fraud, botnets, spam etc. When the number of records within one such category exceeds a pre-determined threshold, some embodiments may break a database corresponding to the respective category into sub-buckets and use hashing to identify a bucket containing each individual record. When issuing a query, the client may send the bucket/category index in cleartext or ciphertext.

Figure 17:
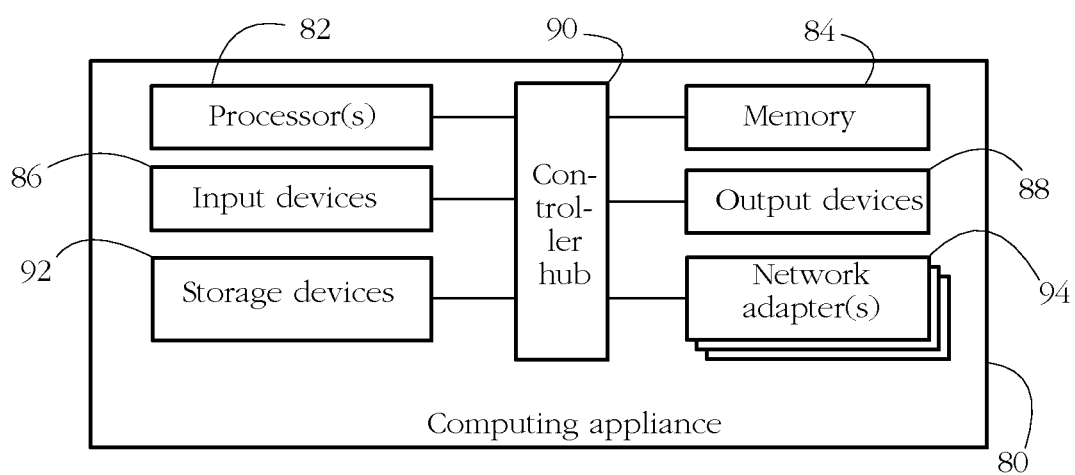
FIG. 17 shows exemplary hardware components of a computing appliance configured to carry out some of the methods and algorithms described herein.

FIG. 17 shows an exemplary hardware configuration of a computing appliance 80 programmed to execute some of the methods described herein. Appliance 80 may represent any of client devices 12*a-f*, router 14, and server 20. The illustrated appliance is a personal computer; other computing devices such as servers, mobile telephones, tablet computers, and wearable computing devices may have slightly different configurations. Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code. Processor(s) 82 may include a central processing unit (CPU) and/or an array of graphics processing units (GPU).

Memory unit 84 may comprise volatile computer-readable media (e.g. dynamic random-access memory—DRAM) storing data and/or instructions accessed or generated by processor(s) 82 in the course of carrying out operations. Input devices 86 may include computer keyboards, mice, and microphones, among others, including the respective hardware interfaces and/or adapters allowing a user to introduce data and/or instructions into appliance 80. Output devices 88 may include display devices such as monitors and speakers among others, as well as hardware interfaces/adapters such as graphic cards, enabling the respective computing device to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 include mechanical, electrical, and signaling circuitry for communicating data over physical links coupled to an electronic communication network (e.g, networks 13 and 15 in FIG. 1) and/or to other devices/computer systems. Adapter(s) 94 may be configured to transmit and/or receive data using a variety of communication protocols.

Controller hub 90 generically represents the plurality of system, peripheral, and/or chipset buses, and/or all other circuitry enabling the communication between processor(s)

82 and the rest of the hardware components of appliance 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

It will also be apparent to one of ordinary skill in the art that aspects of the invention as described above may be implemented in various forms of software, firmware, and hardware, or a combination thereof. For example, certain portions of the invention may be described as specialized hardware logic that performs one or more functions. This specialized logic may include an application specific integrated circuit (ASIC) or a field programmable gate array (FPGA). The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

The exemplary systems and methods described above allow performing various domain name services while preserving the privacy of a beneficiary of the respective services. For instance, some embodiments enable a translation between domain names and IP addresses, wherein the nameserver performing the actual translation/database lookup is unaware of the respective domain name and IP address. Some embodiments use homomorphic encryption to enable a server-side private information retrieval (PIR) procedure. The server returns a ciphertext to the client, which then decrypts the respective ciphertext to produce the desired database entry (e.g. IP address).

In conventional DNS, client queries and/or server replies are not encrypted, so any third party may snoop on the respective DNS data. Newer developments in DNS technology encrypt the query and/or client reply so that in principle, the data is kept private while in transit. However, in such variants of DNS, the nameserver still decrypts the DNS query to produce a cleartext domain name. In contrast to such conventional DNS, in some embodiments the nameserver no longer has access to the transaction data in cleartext, since the PIR procedure uses encrypted inputs. Some embodiments therefore ensure a stronger level of privacy compared to conventional DNS solutions.

PIR procedures are relatively costly in terms of computation and volume of data exchanged in each client-server transaction. To mitigate the costs, some embodiments do not carry out all stages of domain name resolution using PIR. Instead, clients may query top-level domain (TLD) nameservers using conventional DNS or a non-homomorphically encrypted variant such as DNS over HTTPS, and use the PIR procedure only when querying selected nameservers that resolve the respective domain name at a domain and/or subdomain level of the domain name hierarchy. Such strategies rely on the observation that information provided by the latter nameservers is relatively more important for privacy than e.g., the TLD part of the domain name. Some embodiments further apply PIR selectively according to at least a token of the respective FQDN. Stated otherwise, resolving certain tokens (e.g., 'google.com', 'www', etc.) may be done via conventional DNS, while resolving other more privacy-concerning tokens may be carried out via PIR.

DNS databases may carry millions of distinct records. The sheer size of such databases may make PIR queries impractical. To address such limitations, some embodiments further employ a bucketing approach to reduce the size of the database and therefore the complexity of the PIR calculations and the size of queries and server replies. Computer experiments have revealed that reducing database size to 65536 records allows keeping the average time required to carry out a DNS lookup at under 1 s, which makes applications of the current systems and methods commercially and technically viable. The caveat of this approach is that by reducing the size of the database, privacy is also inherently reduced. However, some choices of database size may provide an acceptable compromise between privacy and speed. Furthermore, since PIR procedures are in principle parallelizable, more gains in speed may be achieved by setting up server-side PIR using a parallel computing configuration, e.g., using multiple interconnected processor cores or graphical processing unit (GPU) farms.

Some embodiments of the present invention may be adapted to various other scenarios distinct from domain name resolution, such as computer security, application control, parental control, etc. In one exemplary use case scenario, a computer security component which may execute on the client, on a router/network gateway, or on a remote security server, may engage in a PIR exchange with a server configured to carry out a database lookup without decrypting the respective query. Database records may indicate whether a particular domain is associated with a particular category relevant to computer security, for instance whether the respective domain is blacklisted, or engages in fraudulent activity, etc. In a parental control use case scenario, a database record may indicate, for instance, whether a particular domain distributes adult material. In an application control use case scenario, a database record may indicate whether a respective domain is associated with a particular kind of online activity (gaming, social media, etc.). Some embodiments therefore enable selectively filtering traffic to or from certain domains, or blocking users from accessing certain domains. Although such filtering/blocking is known in the art, in contrast to conventional traffic control procedures, in some embodiments of the present invention the server executing the actual database lookup is unaware of the domain name for which the respective information is requested. This allows, for instance, that the server and associated domain name database be owned and/or operated by an entity distinct from the provider of the security/parental control/application control services, without compromising the privacy of the user.

It will be clear to one skilled in the art that the above embodiments may be altered in many ways without departing from the scope of the invention. Accordingly, the scope of the invention should be determined by the following claims and their legal equivalents.

What is claimed is:

1. A method of performing a domain name service (DNS) lookup comprising employing at least one hardware processor of a computer system to:
    in response to receiving an indicator of a domain name, determine whether a privacy condition is satisfied according to the domain name, wherein the domain name comprises a sequence of tokens, and wherein determining whether the privacy condition is satisfied comprises determining whether a selected token of the sequence of tokens matches any member of a reference list of tokens;

in response to determining that the privacy condition is satisfied, formulate a private query comprising an encryption of a hash index indicative of a location of a record within a domain name database, the hash index encrypted according to a homomorphic encryption procedure, wherein the hash index is determined according to the domain name, and wherein the private query further comprises a version indicator indicative of a hash function used in calculating the hash index;

in response to formulating the private query, transmit the private query to a nameserver configured to determine whether the domain name data is currently indexed according to the hash function, and in response to the hash function, perform an encrypted lookup into the domain name database according to the private query, producing an encryption of the record; and in response to receiving a private reply comprising the encryption of the record from the nameserver, decrypt a content of the private reply according to a homomorphic decryption procedure.

2. The method of claim 1, further comprising, in response to determining that the privacy condition is not satisfied, employing at least one hardware processor of the computer system to:

formulate another query according to the domain name, a content of the other query encrypted according to a non-homomorphic encryption procedure; and transmit the other query to the nameserver.

3. The method of claim 1, wherein the selected token comprises a domain token or a prefix token.

4. The method of claim 1, wherein the record comprises an internet protocol (IP) address.

5. The method of claim 1, wherein the record comprises a security indicator indicative of whether accessing a domain represented by the domain name exposes a user to a computer security threat.

6. The method of claim 1, comprising formulating the private query to include a version indicator indicative of a hash function used in calculating the hash index.

7. The method of claim 1, comprising formulating the private query to include a plurality of encrypted hash indices, each hash index of the plurality of hash indices computed according to the domain name by an application of a distinct hash function, each hash index indicating an alternative location of the record within the domain name database and encrypted according to the homomorphic encryption procedure.

8. A computer system comprising at least one hardware processor configured to:

in response to receiving an indicator of a domain name, determine whether a privacy condition is satisfied according to the domain name, wherein the domain name comprises a sequence of tokens, and wherein determining whether the privacy condition is satisfied comprises determining whether a selected token of the sequence of tokens matches any member of a reference list of tokens;

in response to determining that the privacy condition is satisfied, formulate a private query comprising an encryption of a hash index indicative of a location of a record within a domain name database, the hash index encrypted according to a homomorphic encryption procedure, wherein the hash index is determined according to the domain name, and wherein the private query further comprises a version indicator indicative of a hash function used in calculating the hash index;

in response to formulating the private query, transmit the private query to a nameserver configured to determine whether the domain name data is currently indexed according to the hash function, and in response to determining that the domain name data is currently indexed according to the has function, perform an encrypted lookup into the domain name database according to the private query, producing an encryption of the record; and in response to receiving a private reply comprising the encryption of the record from the nameserver, decrypt a content of the private reply according to a homomorphic decryption procedure.

9. The computer system of claim 8, wherein the at least one hardware processor is further configured to, in response to determining that the privacy condition is not satisfied:

formulate another query according to the domain name, a content of the other query encrypted according to a non-homomorphic encryption procedure; and transmit the other query to the nameserver.

10. The computer system of claim 8, wherein the selected token comprises a domain token or a prefix token.

11. The computer system of claim 8, wherein the record comprises an internet protocol (IP) address.

12. The computer system of claim 8, wherein the record comprises a security indicator indicative of whether accessing a domain represented by the domain name exposes a user to a computer security threat.

13. The computer system of claim 8, wherein the at least one hardware processor is configured to formulate the private query to include a version indicator indicative of a hash function used in calculating the hash index.

14. The computer system of claim 8, wherein the at least one hardware processor is configured to formulate the private query to include a plurality of encrypted hash indices, each hash index of the plurality of hash indices computed according to the domain name by an application of a distinct hash function, each hash index indicating an alternative location of the record within the domain name database and encrypted according to the homomorphic encryption procedure.

15. A non-transitory computer-readable medium storing instructions which, when executed by at least one hardware processor of a computer system, cause the computer system to:

in response to receiving an indicator of a domain name, determine whether a privacy condition is satisfied according to the domain name, wherein the domain name comprises a sequence of tokens, and wherein determining whether the privacy condition is satisfied comprises determining whether a selected token of the sequence of tokens matches any member of a reference list of tokens;

in response to determining that the privacy condition is satisfied, formulate a private query comprising an encryption of a hash index indicative of a location of a record within a domain name database, the hash index encrypted according to a homomorphic encryption procedure, wherein the hash index is determined according to the domain name, and wherein the private query further comprises a version indicator indicative of a hash function used in calculating the hash index;

in response to formulating the private query, transmit the private query to a nameserver configured to determine whether the domain name data is currently indexed according to the hash function, and in response to determining that the domain name data is currently indexed according to the hash function, perform an encrypted lookup into the domain name database according to the private query, producing an encryption of the record; and in response to receiving a private reply comprising the encryption of the record from the nameserver, decrypt a content of the private reply according to a homomorphic decryption procedure.

16. A server computer system configured to engage in domain name service (DNS) transactions with a plurality of clients, the server computer system comprising at least one hardware processor configured to:

receive a private query from a client of the plurality of clients, the private query comprising an encryption of a hash index indicative of a location of a record within a domain name database, the hash index encrypted according to a homomorphic encryption procedure, wherein the hash index is determined according to a domain name, wherein the private query further comprises a version indicator indicative of a hash function used in calculating the hash index, and wherein the private query is generated in response to a determination by the client that a privacy condition is satisfied, wherein determining whether the privacy condition is satisfied comprises determining whether a selected token of the domain name matches any member of a reference list of tokens;

in response to receiving the private query, determine according to the version indicator whether the domain name database is currently indexed according to the hash function;

in response to determining that the domain name database is currently indexed according to the hash function, perform an encrypted lookup into the domain name database according to the private query, producing an encryption of the record, and transmit a private reply comprising the encryption of the record to the client; and in response to determining that the domain name database is not currently indexed according to the hash function, transmit an error message to the client.

17. The server computer system of claim 16, wherein the at least one hardware processor is further configured to:

determine an alternative location for the record within the domain name database according to another hash function; and in response, transmit a specification of the other hash function and another version indicator indicative of the other hash function to the plurality of client systems.

18. The server computer system of claim 16, wherein the record comprises an internet protocol (IP) address.

19. The server computer system of claim 16, wherein the record comprises a security indicator indicative of whether accessing a domain represented by the domain name exposes a user to a computer security threat.

* * * * *